United States Patent
Horimoto et al.

(10) Patent No.: US 7,465,916 B2
(45) Date of Patent: Dec. 16, 2008

(54) OPTICAL DETECTION SENSOR

(75) Inventors: Keiichi Horimoto, Sakura (JP); Akira Sakamoto, Funabashi (JP); Satoshi Okude, Sakura (JP)

(73) Assignee: Fujikura Ltd., Tokyo (JP)

(*) Notice: Subject to any disclaimer, the term of this patent is extended or adjusted under 35 U.S.C. 154(b) by 11 days.

(21) Appl. No.: 11/582,980

(22) Filed: Oct. 19, 2006

(65) Prior Publication Data

US 2008/0093540 A1   Apr. 24, 2008

(51) Int. Cl.
  G01J 1/004   (2006.01)
  G06M 7/00   (2006.01)
  G02B 6/00   (2006.01)
  G02B 6/42   (2006.01)
  G02B 6/38   (2006.01)

(52) U.S. Cl. .................. 250/227.11; 250/221; 385/12; 385/39; 385/63

(58) Field of Classification Search ............... 250/206.1, 250/216, 221, 225, 226, 227.11–227.32; 356/3, 4.1, 6; 385/12, 13, 32, 39, 63, 65, 385/71, 73; 359/341.1–341.3
See application file for complete search history.

(56) References Cited

U.S. PATENT DOCUMENTS

| | | | |
|---|---|---|---|
| 4,479,717 A | 10/1984 | Cornillault | |
| 4,996,418 A | 2/1991 | Iwamoto et al. | |
| 5,068,527 A | 11/1991 | Iwamoto et al. | |
| 6,433,350 B2* | 8/2002 | Hwang et al. | 250/559.11 |
| 2002/0027300 A1* | 3/2002 | Hartmann et al. | 264/1.1 |
| 2005/0129380 A1* | 6/2005 | Takeuchi et al. | 385/137 |

FOREIGN PATENT DOCUMENTS

| | | |
|---|---|---|
| FR | 2 399 000 | 2/1979 |
| JP | 6-8724 B2 | 2/1994 |
| JP | 10-9813 A | 1/1998 |
| JP | 3304696 B2 | 5/2002 |
| JP | 2003-214966 A | 7/2003 |

OTHER PUBLICATIONS

Corning Single Mode Optical Fiber SMF, "Corning SMG-28 Optical Fiber, Product Information", Apr. 2002.*

* cited by examiner

Primary Examiner—Georgia Y Epps
Assistant Examiner—Don Williams
(74) Attorney, Agent, or Firm—Sughrue Mion, PLLC

(57) ABSTRACT

One embodiment of the present invention provides an optical detection sensor configured so as to irradiate exit light emitted from a light source onto an object to be measured, the object being disposed a relative distance away from an end face of a first optical fiber, and receive the reflection light therefrom with a second and a third optical fiber, thereby computing a displacement amount of the object. In this sensor, the first optical fiber is disposed so that an angle between a longitudinal direction thereof and a normal line to an incident surface of the object becomes θ; the second and the third optical fiber are disposed so as to be mutually parallel and so that an angle between a longitudinal direction of the second and the third optical fiber and the normal line becomes θ; the first optical fiber is disposed symmetrically with the second and the third optical fiber with respect to the normal line; and the first to the third optical fiber have a dNA/dλ of $4 \times 10^{-5}$ or less with respect to a wavelength of the light source.

6 Claims, 8 Drawing Sheets

| | NUMERICAL APERTURE (NA) | MODE FIELD DIAMETER ($\mu$m) |
|---|---|---|
| OPTICAL FIBER (1) | 0.11 | 9.2 |
| OPTICAL FIBER (2) | 0.14 | 8.0 |
| OPTICAL FIBER (3) | 0.13 | 8.6 |
| OPTICAL FIBER (4) | 0.21 | 50.0※ |

※ CORE DIAMETER

OPTICAL DETECTION SENSOR

BACKGROUND OF THE INVENTION

1. Field of the Invention

The present invention relates to an optical detection sensor that detects a physical quantity such as pressure, temperature, or the like by measuring a change in light intensity. Specifically, the present invention relates to an optical detection sensor that allows for a highly accurate detection of a displacement amount.

2. Description of the Related Art

There has since been known an electric sensor as a sensor that measures a physical quantity such as an amount of displacement, temperature, pressure or the like of an object subjected to measurement. However, since a measurement signal (electric signal) is transmitted to a remote area through an electric wire, which is prone to influence of electromagnetic noises, there has existed a problem of measurement errors. In contrast, an optical sensor is capable of transmitting a signal without being influenced by electric noises, since a measurement signal is transformed into an optical signal, which is then transmitted through an optical fiber, thereby providing advantages of reduced measurement errors and extremely accurate measurement.

There is such an optical physical quantity sensor that employs a distortion-induced body (for example, a bourdon tube or the like) having a mechanism of being distorted by pressure, then transforms the pressure into distortion, and detects the distortion through a fiber grating (FBG). In addition, there is an optical sensor in which a reflection plate (such as a diaphragm) that displaces itself by pressure is securely attached on an end face of an optical fiber and there is detected a positional change of a reflection light that has once been emitted from the end surface of the optical fiber to be reflected from the reflection plate, thereby to measure the pressure through the position.

As a method of detecting the positional displacement, there are some methods employing a detection of interference or beat frequency caused by plural rays of reflection light (for example, Japanese Patent No. 3304696 (page 15, FIG. 2), or a detection of a resonance frequency occurring in an oscillator secured on a reflection plate (for example, Japanese Patent Application Laid-open Publication No. 2003-2146966 (page 4, FIGS. 1-4). However, these methods have difficulties in signal processing and need complicated arithmetic processing.

In contrast, there is a method of measuring intensity change of reflection light as a simple practical method. This method enables to configure a measurement apparatus using inexpensive materials and components and also to process an obtained signal extremely simply. On the other hand, this method is accompanied by a disadvantage arising from some factors except for a positional displacement of the reflection plate, which is unavoidable for a detection of light intensity. One example of the disadvantage is that a change in light intensity, for example, due to transmission loss is overlapped on a measurement value. However, such a disadvantage can be overcome to improve measurement accuracy by reducing a transmission loss or obtaining an intensity ratio of plural rays of reflection light for compensation.

For example, Japanese Examined Patent Application Publication No. H06-8724 (pages 3 to 4, and FIGS. 1 and 2) discloses a configuration in which there are parallelly secured a first and a second optical fiber, which each have at least one different parameter such as a core diameter, a core refraction index distribution, an aperture number (NA) or the like, so that an end face thereof faces a reflection surface of a reflection plate and the longitudinal direction of the optical fibers are parallel with a normal line to the reflection surface. According to this configuration, light emitted from the end face of the first optical fiber is reflected and then received by the second optical fiber; light emitted from the second optical fiber is reflected by the reflection plate and then received by the first optical fiber; the two beams of reflection light respectively detected through the two optical fibers are each split by a splitter; an intensity ratio is calculated after photoelectric conversion of the respective light is conducted; and thus the ratio is used so as to compensate an influence incurred by a transmission loss.

In addition to the above measurement methods, there are a method in which light beams emitted from respective optical fibers are reflected by a reflection plate so as to return thereto and measured; another method in which two optical fibers as a light emitter and two optical fibers as a light detector, all of which are of the same type, are used and an intensity ratio of each light beam is obtained by not using a light splitter (See, U.S. Pat. Nos. 6,433,350 and 4,479,717, France Patent No. 2399000, and Japanese Patent Laid-open Publication No. H10-9813, or the like).

In addition, U.S. Pat. No. 4,996,418 (FIGS. 1, 15, and 16) discloses a technique in which a plural of multi-mode fibers that can easily be connected optically with a light emitting diode and enjoy a strong light intensity through their own large core diameter are used and secured so as to be at an angle of $\Phi$ ($0° \leq \Phi \leq 5°$) with respect to a normal line to a surface of liquid subjected to the measurement, thereby detecting a displacement of the liquid surface.

However, the technique disclosed in Japanese Examined Patent Application Publication No. H06-8724 has difficulties in selecting measurement sensitivity. This is because special optical fibers having different parameters need to be manufactured when intensity change in the reflection light (measurement sensitivity) occurs in accordance with a change in distance between the optical fibers and the reflection plate, since the longitudinal direction of the optical fibers is parallel with the normal line to the reflection surface. In addition, since the end face of the optical fibers lies at a right angle with respect to the longitudinal direction, there is caused a Fresnel reflection between the end face of the optical fiber and an air layer, and thus measurement accuracy deteriorates through a variation in detection light intensity, an increase in intensity loss, or the like. Moreover, there is easily caused a multiple reflection between the end face of the optical fiber and the reflection plate, thereby deteriorating measurement accuracy.

By the way, since it has since been important to obtain a large light intensity in a system employing light intensity change, use of a multimode optical fiber is effective as disclosed in U.S. Pat. Nos. 4,996,418 and 5,068,527. However, multimode fibers have a problem in that they are influenced by bending, which causes propagation-mode shifts thereby to easily change an NA and loss Use of a light-emitting diode (LED) as a light source is advantageous in terms of costs and polarization dependence. However, since an LED has a temperature dependence in which a shape of emission spectrum changes in accordance with a temperature change, specifically light intensity reduces with an increase in LED temperature and a peak wavelength shifts toward longer wavelengths, use of an optical coupler and an optical filter having a wavelength dependence lead to fluctuation of measurement values, thereby increasing measurement errors. Additionally, use of an optical fiber having a large dependence of NA on wavelength causes a large change in NA due to wavelength changes in LED, leading to a change in a beam shape of the exiting light and an amount of reflection light received, thereby changing a connection efficiency with the reflection surface. Since such a fluctuation in connection efficiency cannot be compensated, measurement accuracy is inevitably deteriorated Although a bending loss does not influence significantly when the optical fiber is used in a digital communication such as an optical communication, it has a large influence leading to a deterioration of measurement accuracy when the optical fiber is used in analog transmission.

The present invention has been made in view of the above disadvantages and the objective thereof is to provide an optical detection sensor that is free from an influence incurred by a transmission line bending, can suppress a fluctuation in measurement caused by an NA change of an optical fiber through a change in wavelength spectrum of a light source, and realizes an accurate measurement.

SUMMARY OF THE INVENTION

In order to achieve the above objective, a first aspect of the present invention provides an optical detection sensor comprising a light source, a first optical fiber guiding exit light emitted from the light source, a second and a third optical fiber receiving reflection light produced in such a way that the exit light is incident upon an object to be measured and thus reflected therefrom, the objective being disposed a relative distance away from an end portion of the first optical fiber; a first and a second detection element receiving the reflection light that is guided through the second and the third optical fiber, thereby to convert the reflection light into an electric signal; and an arithmetic processing means computing a displacement quantity of the object to be measured on the basis of a ratio of the electric signals obtained through the conversion in the first and the second detection element. In this optical detection sensor, the first optical fiber is disposed so that an angle between a longitudinal direction thereof and a normal line to an incident surface of the object to be measured becomes θ; the second and the third optical fiber are disposed so as to be in parallel with each other and so that an angle between a longitudinal direction of the second and the third optical fiber and the normal line becomes θ; the first optical fiber is disposed symmetrically with the second and the third optical fiber with respect to the normal line; and the first to the third optical fiber have a dNA/dλ of $4 \times 10^{-5}$ or less with respect to a wavelength of the light source.

A second aspect of the present invention provides an optical detection sensor according to the first aspect, further comprising a V-grooved array substrate having a first to a third V-groove formed so that a core of the first to the third optical fiber is disposed on an identical plane, wherein an end face of the first to the third optical fiber secured in the V-groove and an end surface of the V-grooved array substrate are placed on an identical surface; and wherein the end faces are formed perpendicular to the normal line.

A third aspect of the present invention provides an optical detection sensor according to the first or the second aspect, wherein the angle θ formed by the first optical fiber and the normal line and the angle θ formed by the second and the third optical fiber and the normal line are $5° \leq θ \leq 10°$.

A fourth aspect of the present invention provides an optical detection sensor according to any one of the first to the third aspect, further comprising a light emitting diode applied as the light source, and a band pass filter whose transmission center wavelength is longer than a peak wavelength of light intensity spectra of the light emitting diode at a temperature of 0 degrees Celsius, the band pass filter having a bandwidth of from 1 nm to 20 nm.

A fifth aspect of the present invention provides an optical detection sensor according to any one of the first to the fourth aspect, wherein the first to the third optical fiber have a numeric aperture NA of from 0.1 to 0.15 at a wavelength of the light source.

A sixth aspect of the present invention provides an optical detection sensor according to any one of the first to the fifth aspect, wherein the first to the third optical fiber have a mode field diameter of from 7.9 μm to 9.3 μm at a wavelength of the light source.

According to the present invention, there can be provided an optical detection sensor that is free from an influence incurred by a transmission line bending, can suppress a fluctuation in measurement caused by an NA change of an optical fiber through a change in wavelength spectrum of a light source, and realizes an accurate measurement.

DESCRIPTION OF THE PREFERRED EMBODIMENTS

Referring to accompanying drawings, preferred embodiments for carrying out the present invention will be described hereinafter.

Figure 1:
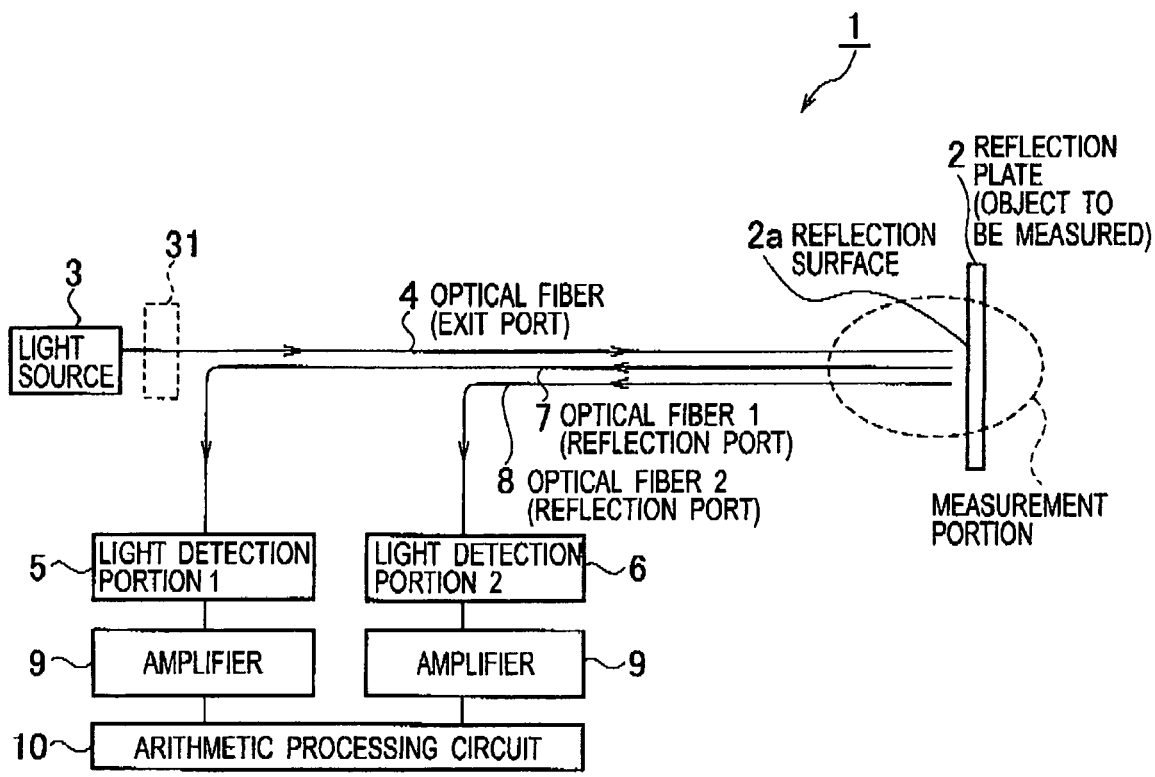
FIG. 1 is a schematic view of an optical detection sensor according to an embodiment of the present invention.
Figure 2:
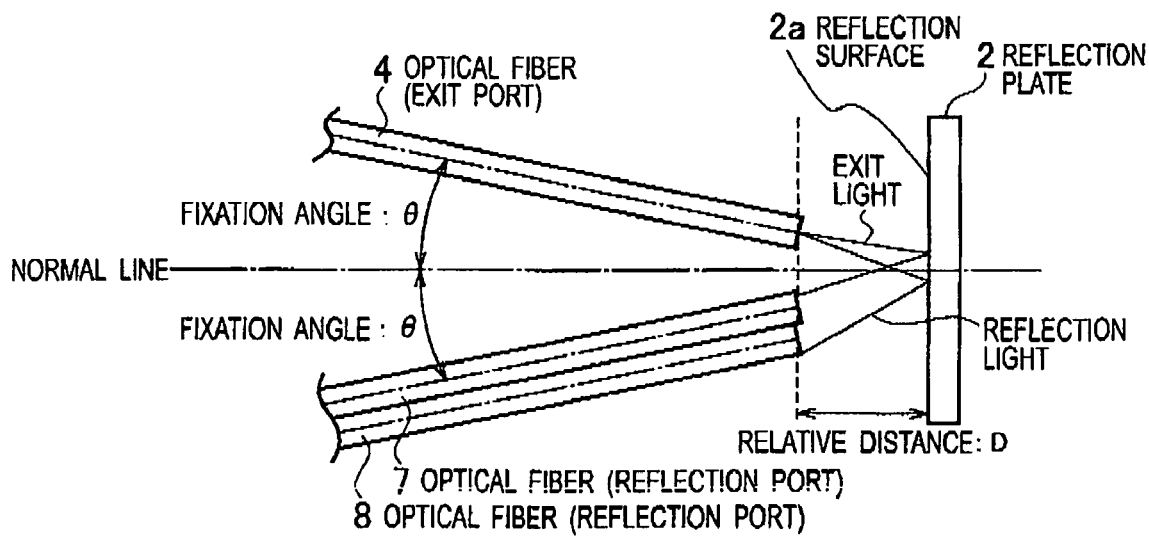
FIG. 2 is an expanded view of a measurement portion A shown in FIG. 1.

FIG. 1 is a schematic view of an optical detection sensor according to an embodiment of the present invention. FIG. 2 is an expanded view of a measurement portion A shown in FIG. 1.

As shown in FIG. 1, an optical detection sensor 1 according to the present invention is comprised of a reflection plate (an object to be measured) 2 that has a reflection surface 2a and whose relative distance D to an end face of an optical fiber changes in accordance with a physical quantity such as pressure, temperature, or the like, a first optical fiber 4 (acting as an exit port) that transmits light from a light source 3 to the reflection plate 2, a second optical fiber 7 and a third optical fiber 8, both of which act as an reflection port, which transmit light reflected by the reflection surface 2a respectively to a first light detection portion 5 and a second light detection portion 6, amplifiers 9 that are respectively provided to the first detection portion 5 and the second light detection portion 6 and amplify an electric signal therefrom, and an arithmetic processing portion (an arithmetic processing circuit) 10 that computes a physical quantity by taking a ratio of the amplified electric signals. In the optical detection sensor 1, the light emitted from an end portion of the first optical fiber 4 is reflected by the reflection surface 2a; reflected light, which is optically connected with the second optical fiber 7, is transmitted to the first light detection portion 5; reflected light, which is optically connected with the third optical fiber 8, is transmitted to the second light detection portion 6; and a displacement amount of the reflection plate 2 is computed in the arithmetic processing circuit 10. An end portion of the first optical fiber 4, the second optical fiber 5 and the third optical fiber 6, and a peripheral area of the reflection plate 2 disposed so as to oppose the end portions will be collectively referred to a measurement portion A, hereinafter, Specifically, as shown expanded in FIG. 2, the three optical fibers 4, 7, 8 are disposed so that an angle of a longitudinal direction thereof with respect to a normal line to the reflection surface 2a is θ. Therefore, the end face of the optical fibers 4, 7, 8 faces obliquely the reflection surface 2a in the measurement portion A. In addition, the second optical fiber 7 and the third optical fiber 8 are disposed in parallel with each other. The first optical fiber 4 is disposed symmetrically with the second optical fiber 7 or the third optical fiber 8 with respect to the normal line of the reflection surface.

As the first to the third optical fiber 4, 7, 8, an optical fiber is selected which has a low dependence of aperture number (NA) on wavelength. Specifically, regarding these optical fibers 4, 7, 8, an NA change rate (dNA/dλ) with respect to a wavelength λ is preferably $4 \times 10^{-5}$ or less. When the NA dependence is low, an NA change due to bending and wavelength change can be less influential, thereby improving measurement accuracy of a displacement measurement.

Moreover, it is preferable that the first to the third optical fiber 4, 7, 8 allow a single mode light propagation, in addition to having a low dependence of NA on wavelength. Even in this case, since the NA dependence on wavelength can be lower, measurement accuracy can be improved. Taking account of a wavelength used and a bending loss, measurement accuracy can be further improved compared to a use of a multimode optical fiber.

The wavelength used here is a peak wavelength in spectrum of a light source to be used. In this embodiment, an LED light source having a wavelength of 1300 nm is used. When a single mode optical fiber is used, it becomes difficult to obtain a larger light intensity because of a small core diameter. However, a digital fast Fourier transfer (FET) carried out after A/D conversion can allow for an accurate measurement. An arithmetic processing circuit for such a processing, an LED, and a photodiode as a light detector, or the like can be inexpensively available, thereby contributing to a cost reduction.

Figure 3:
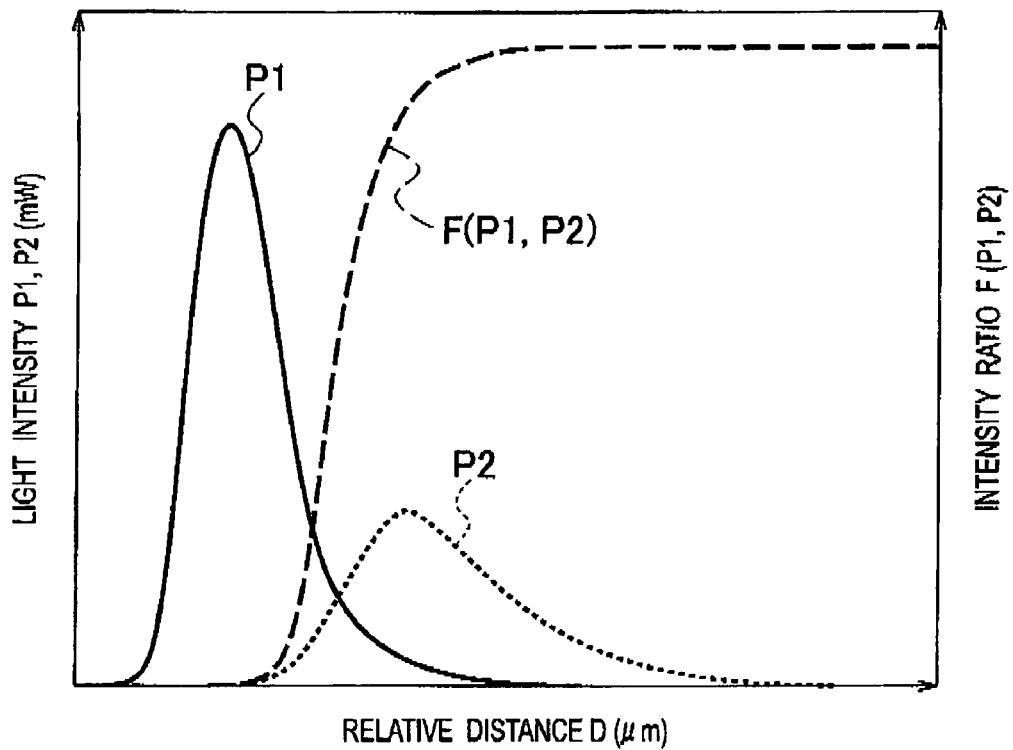
FIG. 3 is a graph showing a variation characteristic of light intensity and an intensity ratio with respect to a relative distance D of the optical detection sensor according to the embodiment of the present invention.

Next, referring to FIG. 3, there will be described a change in light intensity and an intensity ratio in accordance with a change of the relative distance D between the reflection surface 2a and the first to the third optical fibers 4, 7, 8. FIG. 3 is a graph showing bow an light intensity P1, P2 of the light propagating through the second and the third optical fiber 7, 8, respectively and an intensity ratio F(P1, P2) vary in accordance with a change of the relative distance D. The intensity ratio F is defined as $F(P1, P2) = (P2-P1)/(P1+P2)$. In the graph, the horizontal axis represents the relative distance D; the left vertical axis represents a light intensity (mW); and the right vertical axis represents an intensity ratio. This characteristic will be referred to as distance dependence.

As shown in the distance dependence, the intensity P1 of the reflected light of the second optical fiber 7 and the intensity P2 of the reflected light of the third optical fiber 8 are respectively shown as a curve having a peak. Additionally, the intensity ratio F(P1, P2) is shown as a curve that crosses the curve P1 and the curve P2 and has an approximately linear slope. This slope portion is utilized when measuring a physical quantity. When the slope portion is more linear, a compensation function for converting a distance change into a physical quantity becomes simple, thereby providing an advantage of easy processing and lower errors. On the other hand, a measurement sensitivity is shown as a gradient of the slope, that is, $\Delta = dF(P1, P2)/d\lambda$. The larger the $\Delta$ becomes, the higher the measurement sensitivity becomes.

Figure 4:
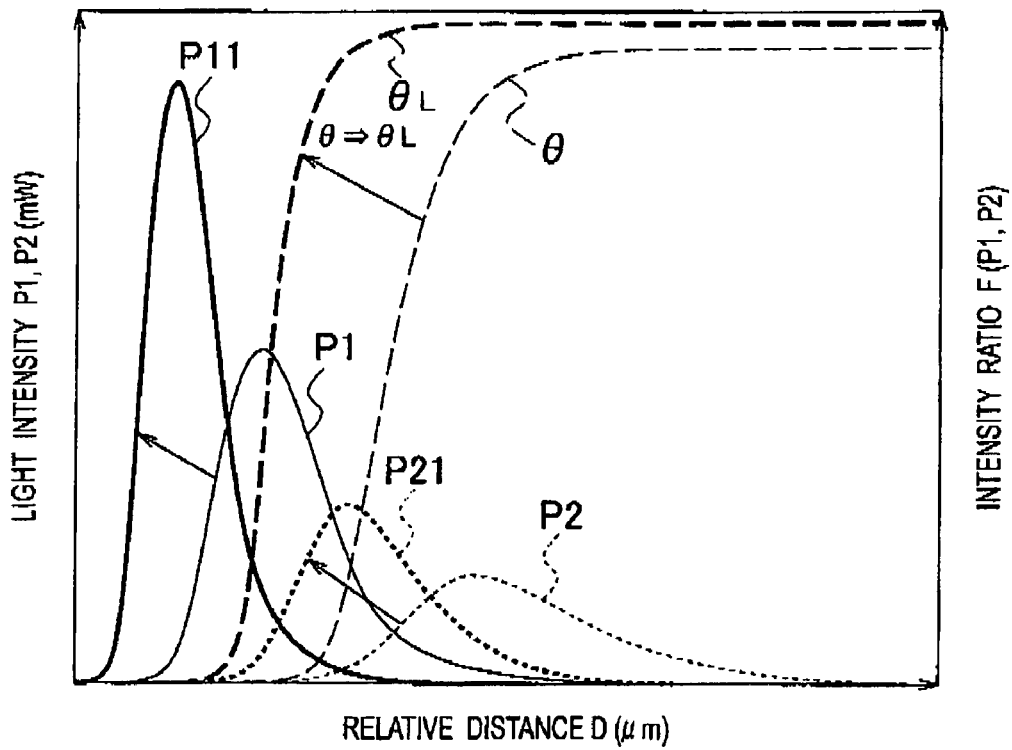
FIG. 4 is a graph for explaining a change in distance dependence when an angle θ of the optical detection sensor changes to θL (θ<θL)

Referring to FIG. 4, there will be described a change in distance dependence when the angle θ changes to θL. When the angle θ becomes larger, the light intensity P1 of the reflected light of the second optical fiber 7 and the light intensity P2 of the reflected light of the third optical fiber 8 are shown by a curve P11 and a curve P21, respectively. Namely, compared to the curve P1 and the curve P2, a peak position shifts toward a shorter relative distance D, that is, toward the reflection surface 2a. In addition, the gradient Δ becomes larger accordingly. On the other hand, when the angle θ becomes smaller, the peak position shifts away from the reflection surface and the gradient Δ becomes smaller accordingly (not shown).

As shown, the gradient Δ changes in accordance with a change of the angle θ, which enables the measurement sensitivity to be easily selected. In addition, measurable light intensity can be adjusted by selecting the angle θ. Namely, when the angle θ becomes larger and the peak position shifts toward a shorter relative distance D, the light intensity becomes larger, whereas when the angle becomes smaller and the peak position shifts toward a longer relative distance D, the light intensity becomes smaller.

A measurement range, that is, a range of the relative distance in which a linear slope exists in the distance dependence is in a trade-off relation with the measurement sensitivity. As the measurement sensitivity becomes larger (the gradient Δ becomes larger), the measurement range becomes narrower. On contrary, as the measurement sensitivity becomes lower the measurement range becomes wider. In addition, when the angle θ is 10° or larger, the measurement range saturates at about 60 μm. Moreover, when a single mode optical fiber is used as the optical fiber, the angle θ of 5° or smaller deteriorates measurement accuracy since the measurable light intensity becomes extremely small. Therefore, the angle θ has to preferably be larger than 5° and 10° or smaller.

Figure 5:
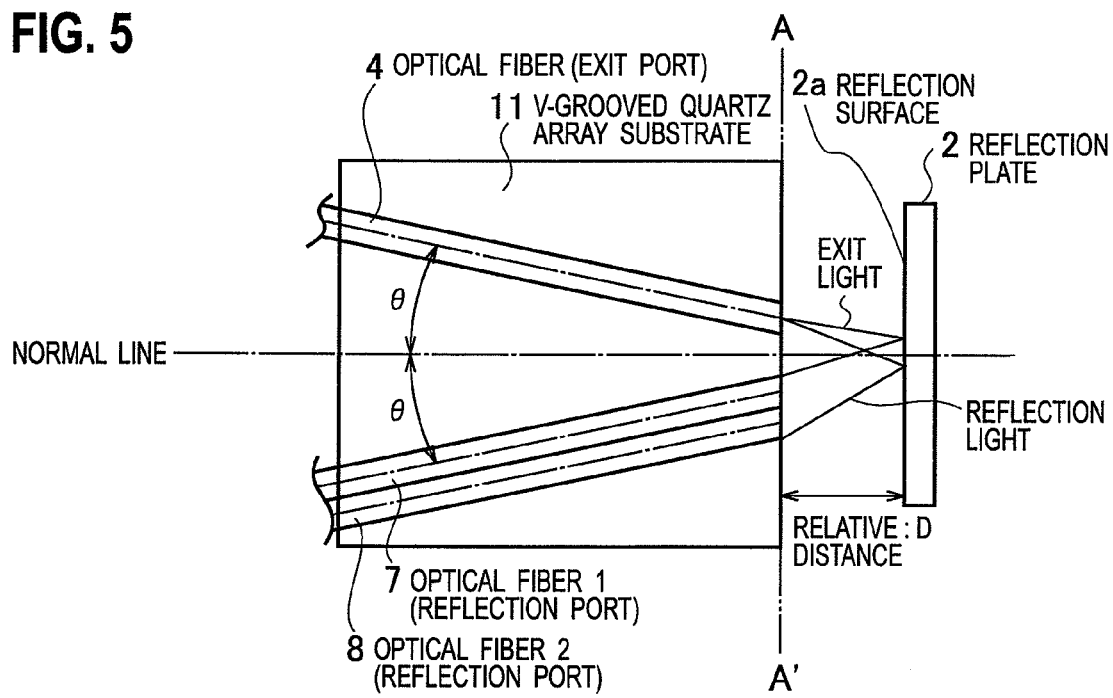
FIG. 5 is an expanded view of a measurement portion Λ of an optical detection sensor according to another embodiment of the present invention.
Figure 6:
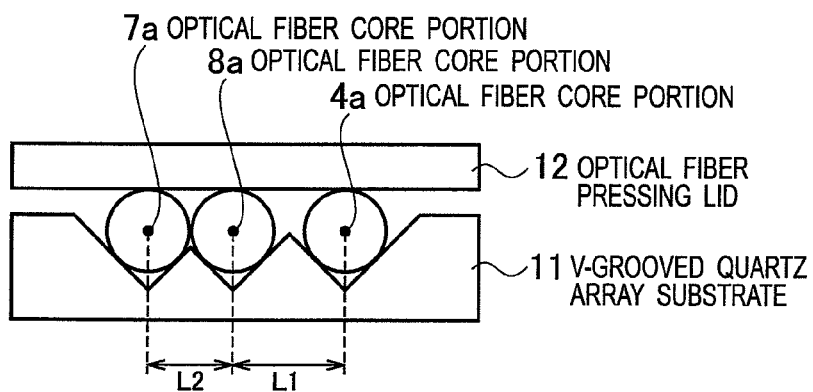
FIG. 6 is a cross-sectional view taken along A-A line in a V-grooved quartz array substrate 11 shown in FIG. 5.

Next, referring to FIGS. 5 and 6, there will be described a measurement portion A where a V-grooved quartz array substrate 11 is used. FIG. 5 is an expanded view of the measurement portion A of an optical detection sensor according to another embodiment of the present invention. FIG. 6 is a cross-sectional view of the V-grooved quartz array substrate 11, taken along A-A line.

As shown in FIGS. 5 and 6, when the first to the third optical fibers 4, 7, 8 are secured at an angle θ, a use of the quartz array substrate 11 that is provided with a V-groove in advance allows for a precise securement of the optical fibers. Namely, the optical fibers are precisely secured on the same plane, thereby preventing the measurement accuracy from deteriorating through suppression of the intensity variations caused by height variations, by fitting the optical fibers tentatively into the V-grooves, placing an optical fiber pressing lid 12 having no grooves thereon from above, and then securing them with resin. By the way, a material to be used to make the V-grooved array substrate is not limited to quartz, but any material can be used as far as the V-groove can be made with high precision.

In addition, as seen from FIG. 6, it is preferable in order to obtain a larger light intensity that a gap between the optical fibers at an end face portion of the V-grooved quartz array substrate 11 is wider. However, the first optical fiber 4 and the second optical fiber 7 that are disposed obliquely with respect to the normal line to the reflection surface 2a have to be spaced away from each other. Taking account of machining precision of the V-groove and manufacturing accuracy of the optical fibers, a gap L1 between a core portion of the first optical fiber 4 and a core portion of the second optical fiber 7 is preferably 140 μm or more and 265 μm or less. Moreover, since the second optical fiber 7 and the third optical fiber 8 are disposed in parallel, a core gap L2 is preferably 127 μm or more and 252 μm or less.

When the end face of the quartz array substrate 11 is polished after the optical fibers are secured, all the optical fibers are terminated obliquely at the end surface thereof. Therefore, Fresnel reflection at the end face of the optical fibers is reduced, thereby improving measurement accuracy. In addition to this, a multiple reflection between the end face of the optical fibers and the reflection plate can be prevented, thereby further improving measurement accuracy.

By the way, a use of an LED as a light source is accompanied by a problem of wavelength shift due to temperature. However, a change in wavelength of the emitted light and intensity of the light can be reduced, by inserting a band pass filter (BPF) 31 between the light source 3 and the first optical fiber 4, as shown in FIG. 1. Specifically, measurement errors due to NA or the like of the optical fibers, which is wavelength-dependent, can be reduced. As an optical characteristic of the BPF to be inserted, it is preferable that the transmission center wavelength is longer than a peak wavelength of the LED at a temperature of 0° C., and the bandwidth is equal to or more than 1 nm and equal to or less than 20 nm. Furthermore, considerations taken on a wavelength to be used and a bending loss, as well as a use of a light source composed of the LED and the BPF and a use of optical fibers having a low NA dependence on wavelength, bring about further improved measurement accuracy.

Therefore, as the first to the third optical fibers 4, 7, 8, an optical fiber having a low NA dependence on wavelength, desirably, of $4\times10^{-5}$ or less is selected and used. As a specific example of the optical fiber having a low dependence of NA on wavelength, a single mode optical fiber is used. Due to this, an NA fluctuation and a bending loss fluctuation are suppressed, thereby improving measurement accuracy.

In addition, height variations can be reduced, and the Fresnel reflection and the multiple reflection at the end face of the optical fibers are suppressed, by securing the optical fibers using the V-grooved quartz array substrate 11 and polishing the end face of the optical fibers and the substrate into the same face, thereby further improving measurement accuracy.

Additionally, the measurement range and sensitivity can be easily selected by adjusting the optical fiber angle θ, which further improves measurement accuracy.

Moreover, when the light source employs an LED, a combination of the LED and a band pass filter can suppress a temperature dependence of the LED. Furthermore, since the dependence of NA of the optical fibers on wavelength can also be suppressed, a synergetic effect of both can further improve measurement accuracy.

EXAMPLE 1

There will be described a first example of an optical detection sensor according to the present invention hereinafter.

In this example, the V-grooved quartz array substrates 11 in which the angle θ of the first to the third optical fiber 4, 7, 8 was 4°, 5°, 6°, 8°, and 10°, respectively, were used to configure the optical detection sensor according to the above another embodiment. As shown in FIG. 5, the end face of each quartz array substrate was disposed so as to oppose the reflection plate 2. Then, light emitted from the first optical fiber 4 was incident upon the reflection surface 2a; the reflected light was detected through the second optical fiber 7 and the third optical fiber 8; the intensity ratio was calculated from each light intensity P1 and P2; and a change in intensity ratio was measured while changing the relative distance D. The light intensity ratio F is calculated based on the formula $F(P1, P2)=(P2-P1)/(P1+P2)$.

Figure 7:
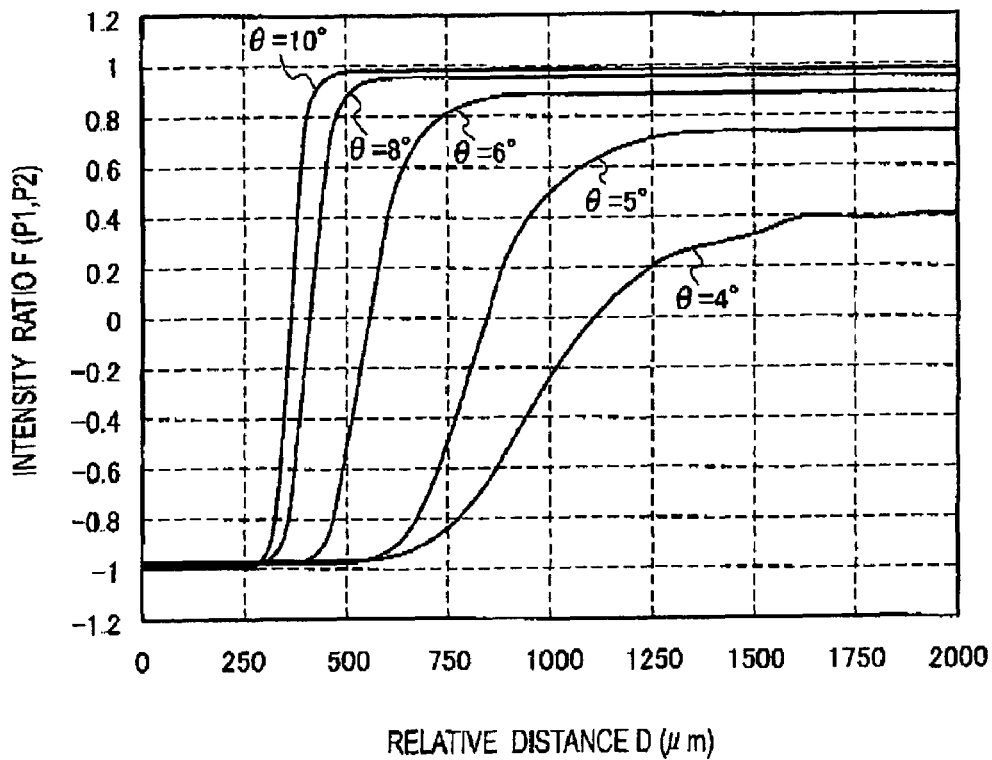
FIG. 7 is a graph showing a measurement result of a light intensity ratio F with respect to a change of relative distance D, in a first example of the present invention.

FIG. 7 shows a measurement result of the light intensity ratio in accordance with a change in the relative distance D. In the figure, the horizontal axis represents the relative distance D and the vertical axis represents the intensity ratio.

As shown in FIG. 7, as the relative distance D becomes larger, the intensity ratio is increased. Since the gradient Δ of the linear slope portion becomes larger as the angle θ becomes larger, the measurement sensitivity becomes higher and the measurement range becomes narrower. In addition, when the angle θ becomes larger, the intensity ratio curve rises at a shorter relative distance. This is because the light intensity reaches a peak at a shorter relative distance when the angle θ is large. Due to this, an absolute value of the measurable light intensity becomes larger.

Figure 8:
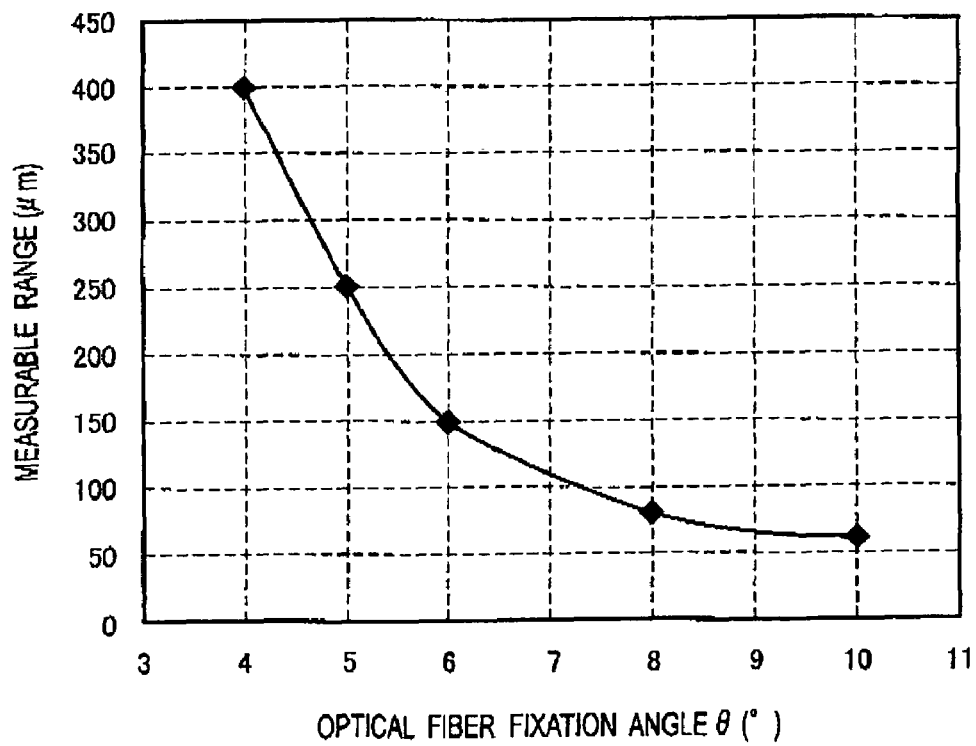
FIG. 8 is a graph showing a relation between an angle θ and a measurement range, in the first example of the present invention.

From these results, a relation between the angle θ and the measurement range is shown in FIG. 8. In the figure, the horizontal axis represents the relative distance D and the vertical axis represents the measurement range. According to the figure, when the angle θ exceeds 10°, the measurement range saturates at about 60 μm. On the other hand, even when the angle becomes larger than 10°, the measurement sensitivity scarcely changes. In addition, while a wider measurement range of 400 μm can be realized at an angle θ of 4°, the light intensity becomes extremely small, leading to a deteriorated measurement accuracy. Therefore, the angle is desirably larger than 5° for a practical use. In view of the foregoing, it can be said that the angle θ of larger than 5° and 10° or less is an optimized range.

EXAMPLE 2

There will be described a second example of an optical detection sensor according to the present invention hereinafter.

In this example, an optical detection sensor was configured so that an LED was used as a light source and a BPF was inserted between the light source and the first optical fiber. There will be described a comparison between where the BPF is inserted and where the BPF is not inserted, in terms of light intensity variation while an LED temperature changes from 0 degree Celsius to 80 degrees Celsius.

Figure 9:
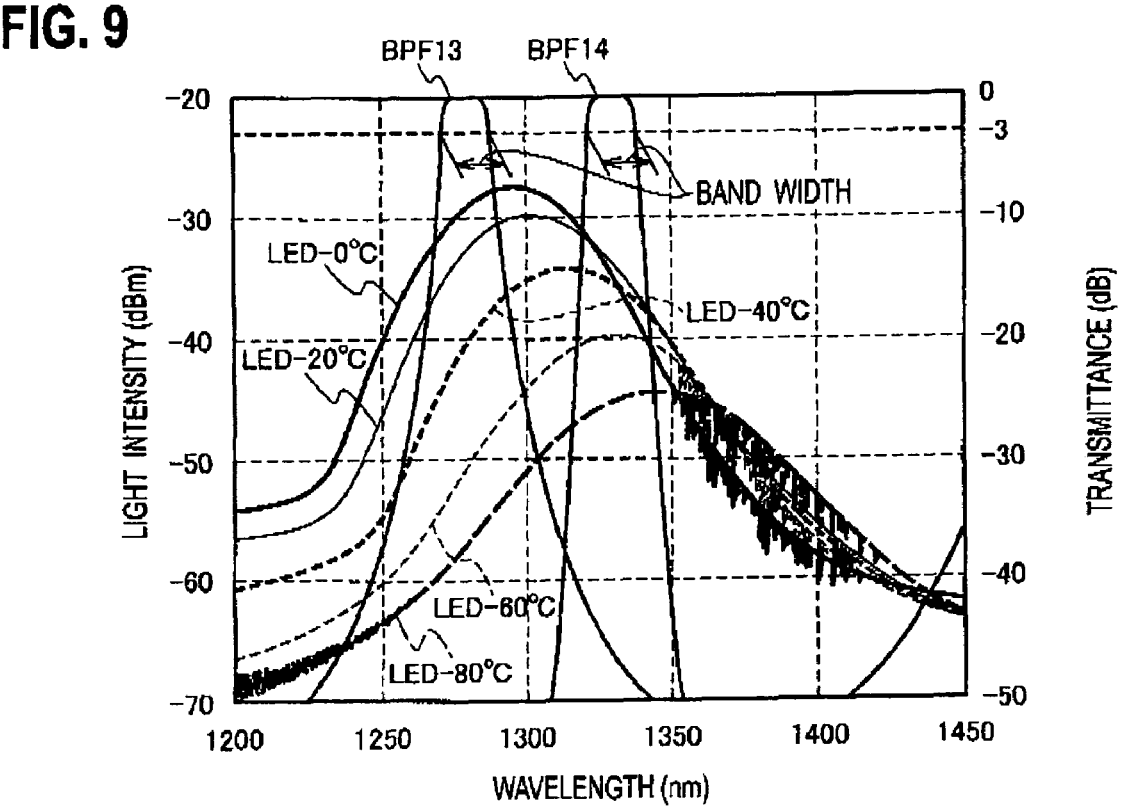
FIG. 9 is a graph showing a change in intensity spectrum with respect to temperature when a BPG is not inserted to an LED, in a second example of the present invention.

FIG. 9 is intensity spectra shown as the LED temperature as a parameter, where the BPF is not provided to the LED. In FIG. 9, the horizontal axis represents a wavelength; the left vertical axis represents light intensity; and the right vertical axis presents transmissivity.

As shown in FIG. 9, it has been confirmed that the intensity spectra shift downward as a whole as the temperature rises. In addition, it has been confirmed that a peak wavelength shifts toward longer wavelengths by about 40 nm when the LED temperature increases from 0 degrees Celsius to 80 degrees Celsius.

Figure 10:
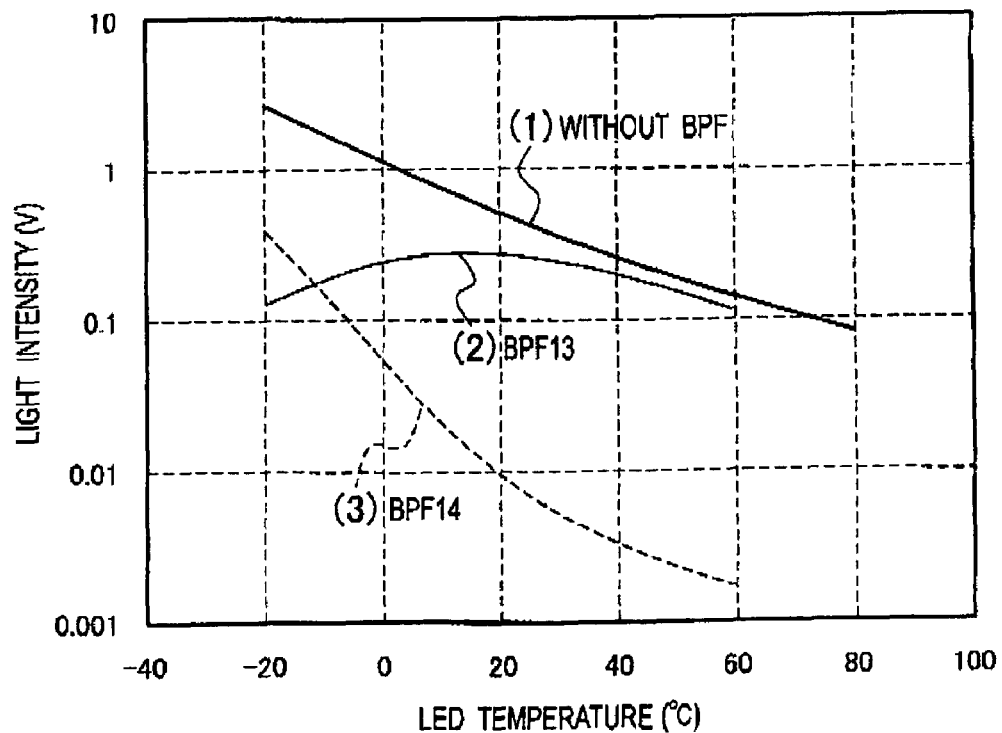
FIG. 10 is a graph showing intensity fluctuations with respect to temperature when a BPF 13 and a BPF 14 are inserted, in the second example of the present invention.

Next, there will be described where a first BPF 13 having a center wavelength of 1330 nm and a bandwidth of about 10 nm and a second BPF 14 having a center wavelength of 1280 nm and a bandwidth of about 10 nm are respectively inserted between the LED and the first optical fiber as shown in FIG. 9. FIG. 10 shows an intensity change where the first BPF 13 and the second BPF 14 are respectively inserted. In FIG. 10, the horizontal axis represents the LED temperature and the vertical axis represents the light intensity. While (1) a difference between the maximum intensity and the minimum intensity amounts to more than a factor of 10 when there is no BPF, (2) the difference can be reduced to about a factor of about 20 when the first BPF 13 is inserted. However, (3) a quantity of the intensity change becomes a factor of 100 or more, which means deterioration, when the second BPF 14 is inserted. Namely, while an insertion of the BPF can lead to suppression of wavelength shift due to the LED temperature changes, the effect depends on the center wavelength of the BPF. From the results shown in FIG. 10, it is preferable to use the BPF having a transmission range in a longer side of a peak wavelength obtained at an LED temperature of 0 degrees Celsius. In addition, the bandwidth is preferably more than 10 nm, since an absolute value of the light intensity becomes small when the bandwidth is too narrow, which leads to a deterioration of measurement accuracy. On the other hand, when the bandwidth is too wide, since a change in intensity spectrum becomes influential, the bandwidth is preferably 20 nm or narrower.

EXAMPLE 3

There will be described a third example of an optical detection sensor according to the present invention hereinafter.

Figures 11, 12:
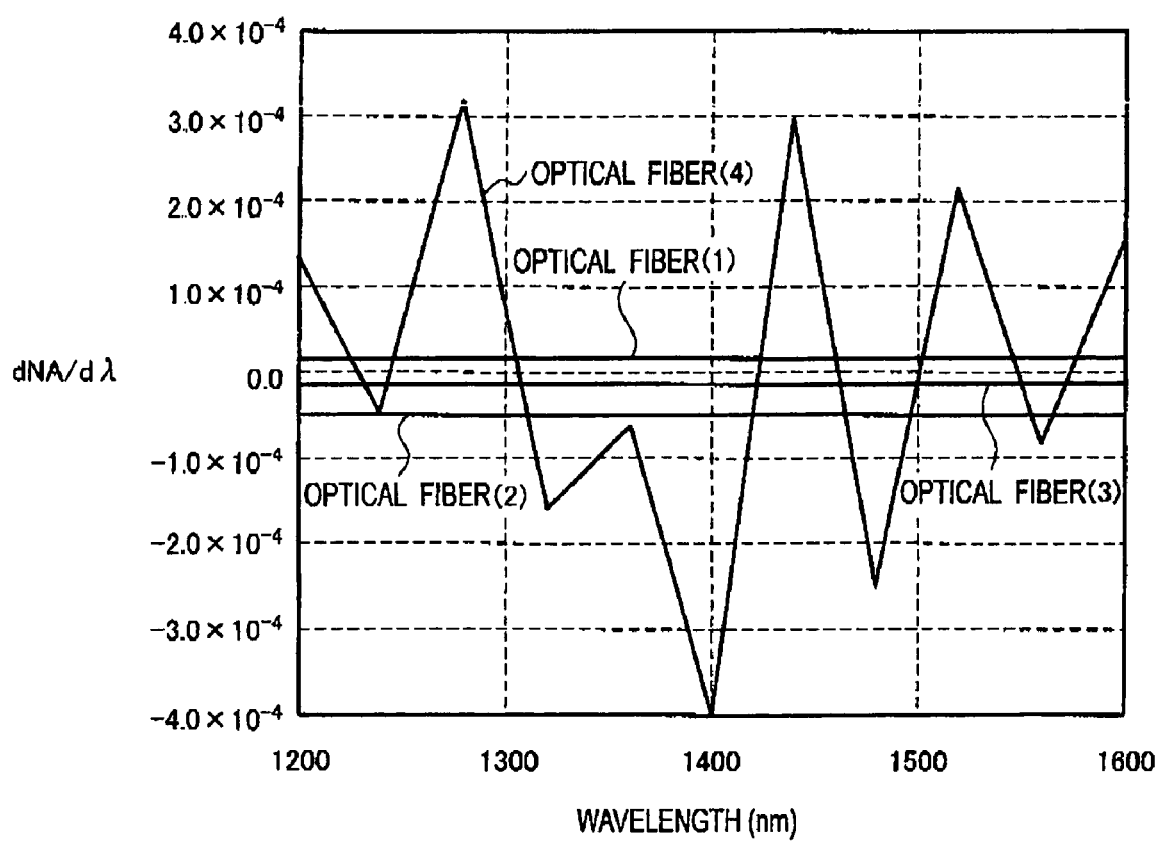
FIG. 11 is a table summarizing a mode field diameter and an NA of four types of optical fibers at a wavelength of 1300 nm according to a third example of the present invention.
FIG. 12 is a graph showing a measurement result of a dependence of NA on wavelength in an optical fiber in the third example of the present invention.

In this example, optical fibers (1), (2), and (3) that allow for a single mode (SM) transmission and an optical fiber (4) that allows for a multimode (MM) transmission were used and their dependence of NA on wavelength was respectively measured. FIG. 11 shows an NA at a wavelength of 1300 nm and a mode field diameter of the four kinds of the optical fibers used in this experiment. By the way, since the optical fiber (4) is an MM optical fiber, a core diameter, which is used as a generic evaluated value, is listed regarding the mode field diameter in FIG. 11.

FIG. 12 shows a measurement result of a dependence of NA on wavelength for each of these optical fibers. In this figure, the horizontal axis represents the wavelength $\lambda$ and the vertical axis represents $dNA/d\lambda$, which is an NA change with respect to a wavelength $\lambda$ change. In comparison with the SM optical fibers (1) through (3), the $dNA/d\lambda$ of the MM optical fiber (4) has a relatively large variation and is not repeatable. Therefore, when using the MM optical fiber, the NA changes due to wavelength changes, and thus measurement accuracy is deteriorated. In the SM optical fibers, a value of the $dNA/d\lambda$ or the optical fiber (2) is $4.8 \times 10^{-5}$, which is considered large; and a value of the $dNA/d\lambda$ of the optical fibers (1) and (3) is $1.5 \times 10^{-5}$ or less, which is considered small. Therefore, a use of an SM optical fiber having a small $dNA/d\lambda$, such as the optical fibers (1) and (3), can effectively suppress an NA variation due to a wavelength change, thereby further reducing a measurement error. When a large measurement intensity has to be obtained, the optical fiber (1) should be best used since a smaller NA is better.

EXAMPLE 4

There will be described a fourth example of an optical detection sensor according to the present invention hereinafter.

In this example, the SM optical fibers (1), (2) and (3) were prepared and an intensity ratio F(P1, P2) was measured using the optical detection sensor employing the V-grooved quartz array substrate 11 in FIG. 5, in a wavelength range of from 1200 nm to 1600 nm, so as to investigate a change in intensity ratio. Here, although there will be explained where an optical fiber angle $\theta$ is 5° as one example, different angles have led to about the same result. By the way, a mode field diameter and an NA of the optical fibers used in this example are as shown in FIG. 11. The relative distance D is set as a distance that provides the most linear slope at a wavelength of 1200 nm in the distance dependence.

Figure 13:
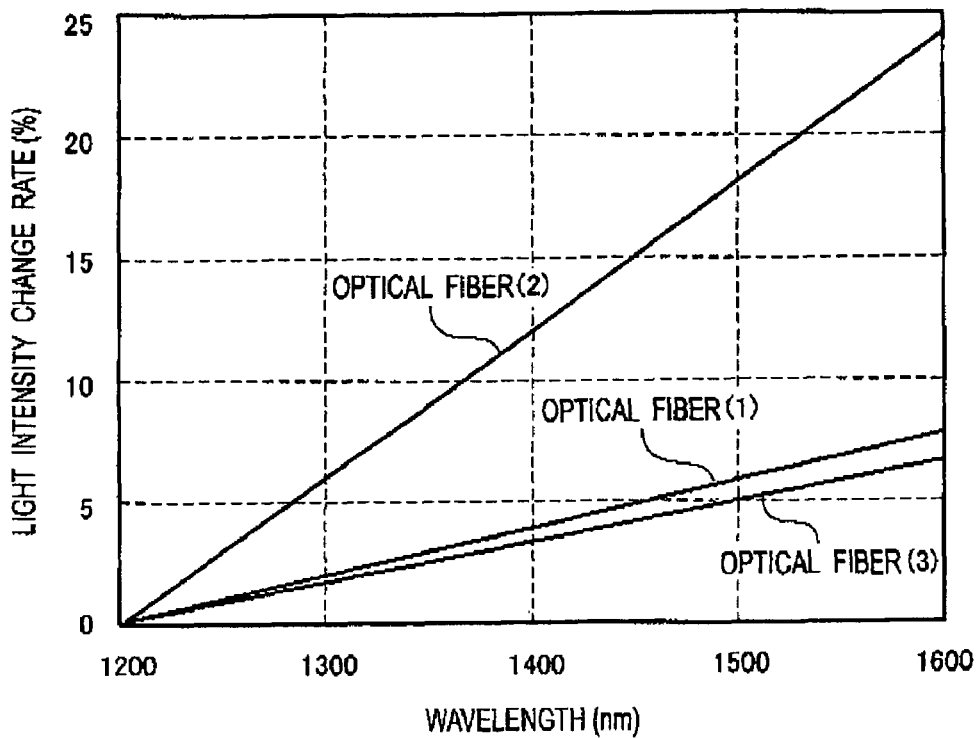
FIG. 13 is a graph showing a relation of a change in the intensity ratio with respect to a wavelength change in an fourth example of the present invention.

FIG. 13 shows a change in intensity ratio with respect to a wavelength change. In the figure, the horizontal axis represents a wavelength and the vertical axis represents the change in intensity ratio. Here, the change in intensity ratio denotes a change ratio with respect to a full scale of the intensity ratio used in practical, with the intensity ratio at a wavelength of 1200 nm as a reference. A larger slope in the figure provides a larger dependence on wavelength. When a light source used is an LED, the wavelength shifts toward longer wavelengths by about 40 nm when a temperature changes from 0 degree Celsius to 80 degrees Celsius. A permissible measurement error in a practical use has to be −1% or more and 1% or less, which corresponds to an intensity change dF(P1, P2)/d) of $2.5 \times 10^{-4}$ or less when converted thereto.

Figure 14:
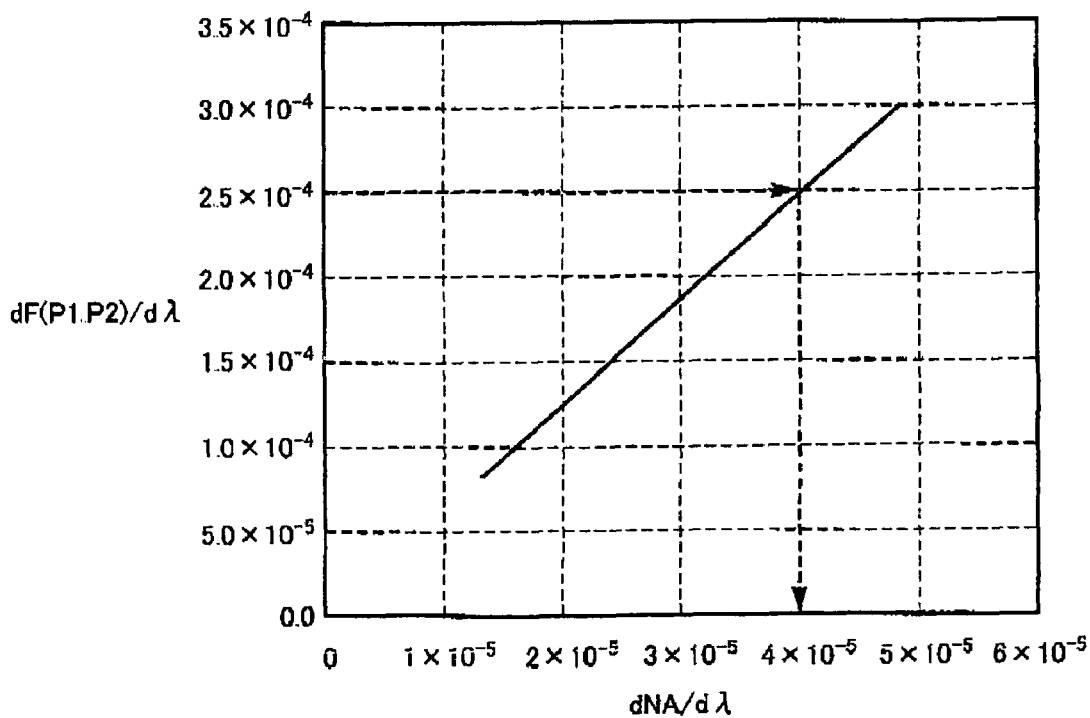
FIG. 14 is a graph showing a relation between an NA change (dNA/dλ) and dF(P1, P2)/dλ with respect to a change in wavelength λ in the fourth example of the present invention.

FIG. 14 shows a relation between $dF(P1, P2)/d\lambda$ and $dNA/d\lambda$, which varies with respect to a wavelength. From this result, it has been shown that the $dNA/d\lambda$ has to be $4 \times 10^{-5}$ or less in order to obtain $dF(P1, P2)/d\lambda$ of $2.5 \times 10^{-4}$ or less, and thus a measurement accuracy can be improved by using an optical fiber having the NA dependence on wavelength in such a range.

EXAMPLE 5

There will be described a fifth example of an optical detection sensor according to the present invention hereinafter.

In this example, two types of optical fibers having each a different NA were used and their bending loss was measured. A mode field diameter and an NA of the optical fibers used in this example at a wavelength of 1300 nm are as shown in FIG.

11. The bending loss was measured at a bending diameter of 20 mm. The measurement was made while gradually increasing the number of turns. Additionally, two light sources—one having a wavelength of 1300 nm and the other having a wavelength of 1550 nm—were used in the measurement.

Figure 15:
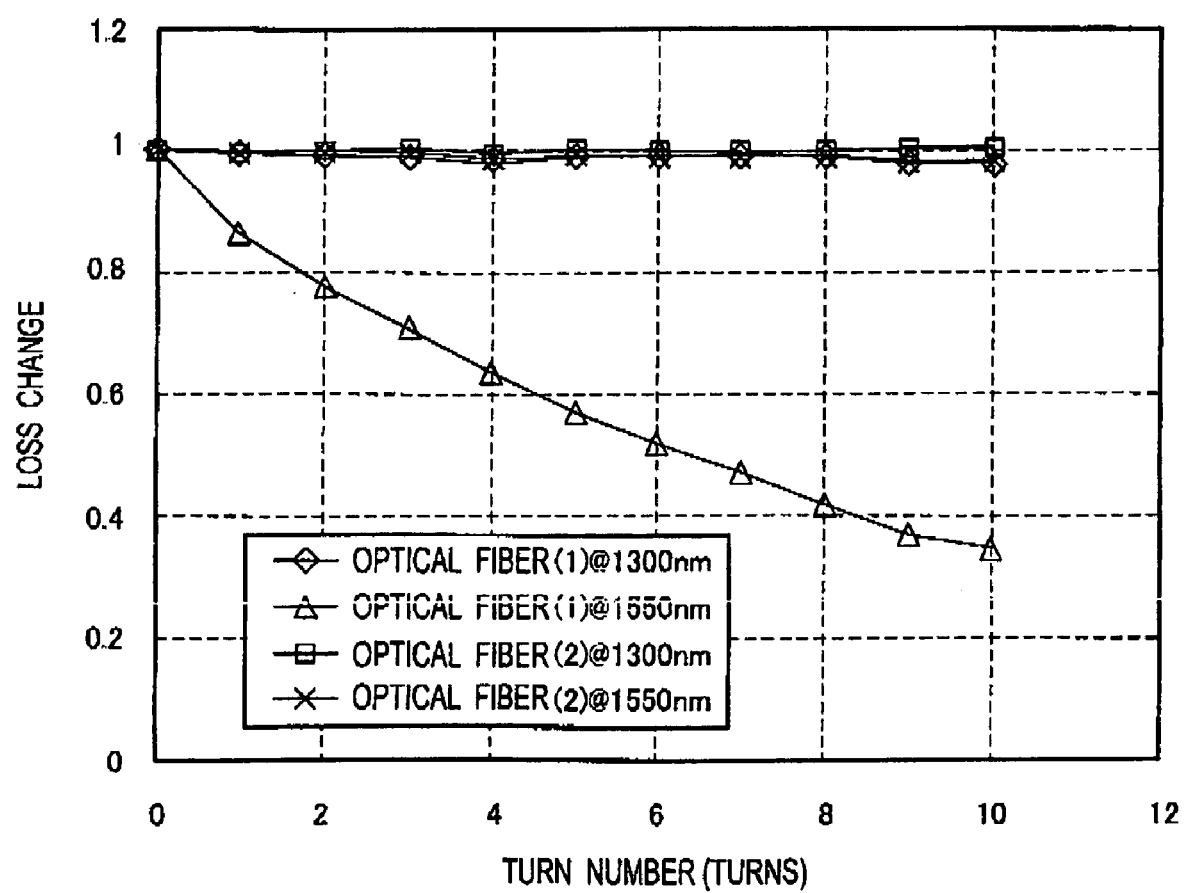
FIG. 15 is a graph showing a measurement result of bending loss of an optical fiber in a fifth example of the present invention.

FIG. 15 shows a measurement result of the bending loss of each optical fiber. In the figure, the horizontal axis represents the number of turns and the vertical axis represents a loss change. According to this measurement result, in the case of a wavelength of 1300 nm, the optical fibers (1) and (2) have a low bending loss and the loss does not increase even when the number of turns is increased. However, in the case of a wavelength of 1550 nm, while the optical fiber (2) scarcely has a bending loss, the optical fiber (1) has a large bending loss and the intensity is halved when a number of turns is 6.

From the above measurement results, it has been shown that the bending loss of the optical fibers varies with the wavelength of the light source used. Therefore, it has been shown that an optical fiber has to be optimally selected depending on the wavelength used and thus a measurement loss can be reduced by selecting appropriately a combination of the light source and the optical fiber.

Although the invention has been described in conjunction with the foregoing specific embodiments, many alterations and modifications will be apparent to those skilled in the art. Those alterations and modifications are intended to fall within the spirit and scope of the appended claims.

What is claimed is:

1. An optical detection sensor comprising:
   a light source,
   a first optical fiber guiding exit light emitted from the light source,
   a second and a third optical fiber receiving reflection light produced in such a way that the exit light is incident upon an object to be measured and thus reflected therefrom, the object being disposed a relative distance away from an end portion of the first optical fiber;
   a first and a second detection element receiving the reflection light that is guided through the second and the third optical fiber, thereby to convert the reflection light into an electric signal; and
   an arithmetic processing means computing a displacement quantity of the object to be measured on the basis of a ratio of the electric signals obtained through the conversion in the first and the second detection element;
   wherein the first optical fiber is disposed so that an angle between a longitudinal direction thereof and a normal line to an incident surface of the object to be measured becomes $\theta$;
   wherein the second and the third optical fiber are disposed so as to be in parallel with each other and so that an angle between a longitudinal direction of the second and the third optical fiber and the normal line becomes $\theta$;
   wherein the first optical fiber is disposed symmetrically with the second and the third optical fiber with respect to the normal line; and
   wherein the first to the third optical fiber have a dNA/d$\lambda$ of $4 \times 10^{-5}$ or less with respect to a wavelength of the light source.

2. An optical detection sensor as recited in claim 1, further comprising a V-grooved array substrate having a first to a third V-groove formed so that a core of the first to the third optical fiber is disposed on an identical plane, wherein an end face of the first to the third optical fiber secured in the V-groove and an end surface of the V-grooved array substrate are placed on an identical surface; and wherein the end faces are formed perpendicular to the normal line.

3. An optical detection sensor as recited in claim 1, wherein the angle $\theta$ formed by the first optical fiber and the normal line and the angle $\theta$ formed by the second and the third optical fiber and the normal line are $50° < \theta \leq 10°$.

4. An optical detection sensor as recited in claim 1, further comprising a light emitting diode applied as the light source, and a band pass filter whose transmission center wavelength is longer than a peak wavelength of light intensity spectra of the light emitting diode at a temperature of 0 degrees Celsius, the band pass filter having a bandwidth of from 1 nm to 20 nm.

5. An optical detection sensor as recited in claim 1, wherein the first to the third optical fiber have a numeric aperture NA of from 0.1 to 0.15 at a wavelength of the light source.

6. An optical detection sensor as recited in claim 1, wherein the first to the third optical fiber have a mode field diameter of from 7.9 μm to 9.3 μm at a wavelength of the light source.

* * * * *